Patented Nov. 5, 1946

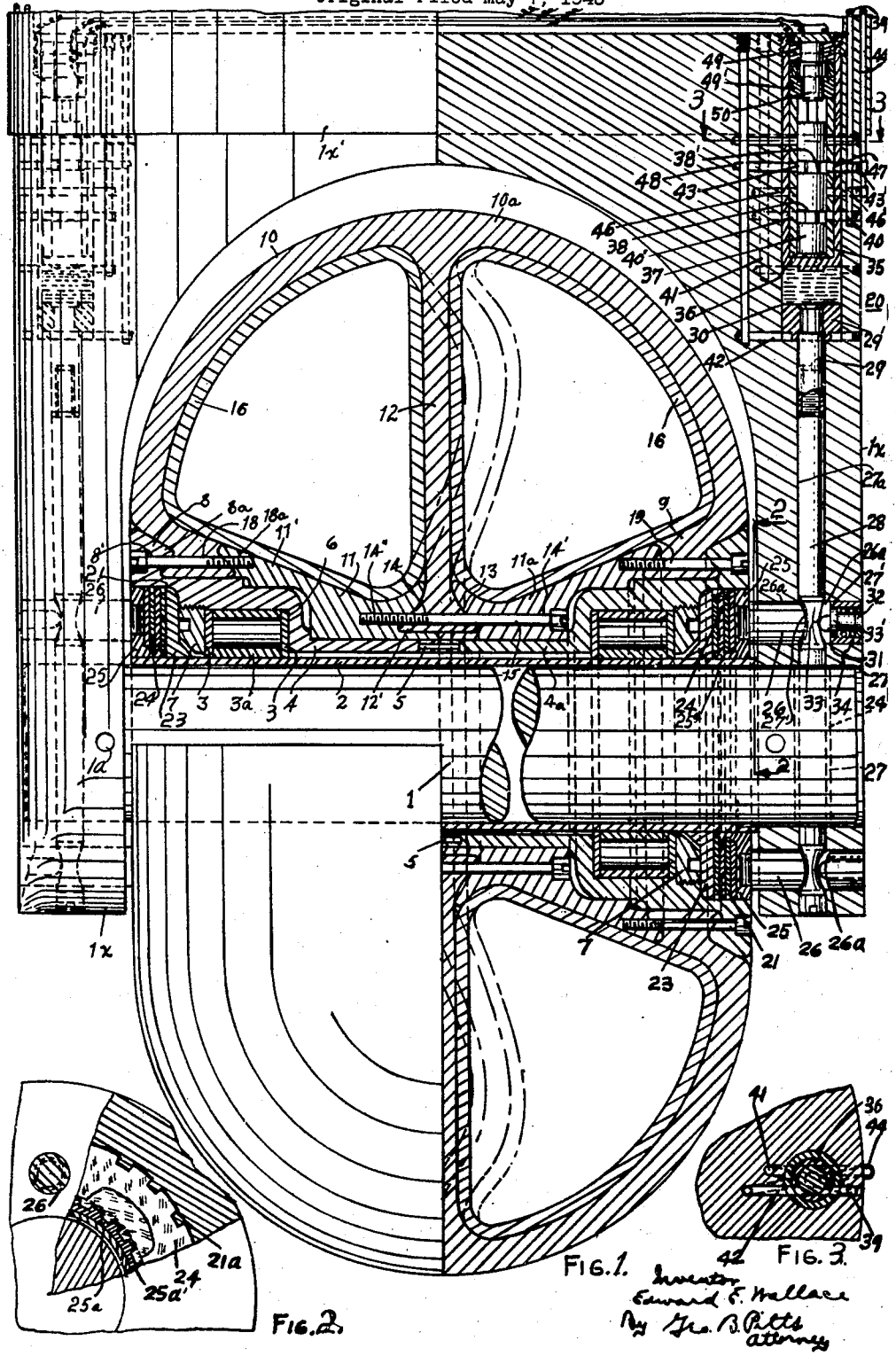

2,410,470

UNITED STATES PATENT OFFICE 2,410,470

COMBINED WHEEL MOUNTING AND BRAKE THEREFOR

Edward E. Wallace, Cleveland Heights, Ohio

Original application May 7, 1943, Serial No. 485,979. Divided and this application August 17, 1944, Serial No. 549,935

8 Claims. (Cl. 188—18)

This invention relates to a mounting for a wheel having incorporated therein a brake and operating means therefor. The wheel is, for illustrative purposes, shown mounted on an axle which in turn is mounted on the outer end of a supporting member for an airplane such as shown in my co-pending application filed April 14, 1943, Serial No. 482,991.

This application is a division of my co-pending application Serial No. 485,979, filed May 7, 1943.

One object of the invention is to provide an improved mounting for a wheel having incorporated therein a brake and an operating means therefor.

Another object of the invention is to provide an improved mounting for a wheel consisting of a bifurcated member, wherein is provided a brake for the wheel and its operating means.

Other objects of the invention will be apparent to those skilled in the art to which my invention relates from the following description taken in connection with the accompanying drawing, wherein Fig. 1 is a view, partly in elevation and partly in section, of a wheel, its mounting, brake and operating means, embodying my invention.

Figs. 2 and 3 are sections on the lines 2—2 and 3—3, respectively, of Fig. 1.

In the drawing, 1 indicates a wheel axle supported at its opposite ends in the depending arms or bifurcations 1x of a support 1x', which may consist of a retractile member as shown in the aforesaid application Ser. No. 482,991, the axle being preferably fixed to the arms by suitable pins 1a (see Fig. 1).

The axle 1 is surrounded by a sleeve 2 with which parts of suitable anti-friction bearing cages 3 and the inner bearing races 3a thereof (the bearings being preferably of the roller type) engage. The wheel rim consists of two annular elements 4, 4a, in side by side relation and connected together by a plurality of dowel pins 5 (two only being shown). The walls of the annular elements, adjacent their outer portions are off-set radially to form annular chambers 6 to accommodate the bearing cages 3, the outer bearing races having engagement with the side walls of the chambers. The side wall of each chamber 6 adjacent its outer end is (a) provided internally with screw threads to take a ring nut 7 which is tightened against the adjacent cage 3 to secure it in the adjacent chamber 6, and (b) extended radially circumferentially, as shown at 8, to provide an inwardly extending rib 8a, which laps over and has interlocking engagement with the annular bead 9 on the adjacent side wall of a tire carcass 10. The inner side portions of the annular elements 4, 4a, and end walls of the chamber 6 form seats for annular keying elements 11, 11a, which co-operate with the ribs 8a to lock the carcass 10 in position around the wheel rim. As shown, the carcass 10 comprises a tread portion 10a, which may be provided with suitable capping material (not shown), side walls having the beads 9 and a central web 12 extending radially inwardly from the tread portion 10a throughout its circumference. The inner peripheral portion of the web 12 is enlarged laterally on its opposite sides throughout its circumference, as shown at 12', which enlargement fits into a recess 13 formed by cut-aways in the opposed or inner ends of the keying elements 11, 11a. At spaced points throughout its circumference the enlargement 12' is formed with a plurality of spaced transverse through openings 14 each in registry with a through opening 14' formed in one of the keying elements 11, 11a, whereby countersunk screws 15 may be mounted in the opening 14 and 14' and threaded into threaded openings 14'' formed in the other keying element to secure these parts together with the enlargement 12' locked between them. Each keying element 11, 11a throughout its circumference is extended outwardly, as shown at 11', over the side wall of the adjacent chamber 6, for engagement with the adjacent bead 9, whereby the keying element and bead may form a suitable seat for the walls of an inner tube 16. As shown, the web 12, keying elements 11, 11a, beads 9 and carcass side walls and tread portion thereof form cavities for the inner tubes 16, each of which may be inflated or deflated through a suitable valve in a nipple (not shown). By preference, each wall 8 is formed throughout its circumference with a plurality of openings 8' each in registry with a through opening 18 formed in the adjacent bead 9, so that countersunk screws 19 extending through these openings may be threaded into openings 18a formed in the adjacent extensions 11' to secure the bead 9 between these parts.

It will be understood that the construction of the tire forms no part of the present invention as it forms the subject-matter of my aforesaid original application and that the tire and its mounting may be of any desired form of construction.

20 indicates as an entirety a brake and its operating means, the operating means being of the hydraulic type, but electrically controlled.

By preference a brake mechanism is provided at each side of the wheel, but as these mechanisms are similar in construction only one thereof will be described. The walls of the chambers 6 are shaped to provide enlarged annular recesses 21 outwardly of the ring nuts 7 to accommodate the sets of annular braking elements, each of which sets consists of an inner bearing member 23 suitably fixed to the walls of the adjacent recess 21, a plurality of annular friction members 24, and an outer pressure member 25. The side walls of the recess are splined as shown at 21a in Fig. 2 and alternate friction members 24 are provided on their outer peripheries with complementary splines fitting the splines 21a to prevent rotation thereof, whereas the inner periphery of the pressure member 25 is provided with an inwardly extending collar 25a, the inner wall of which is splined, as shown at 25a' in Fig. 2 and the inner periphery of the other friction members 24, are provided with complementary splines fitting the splines 25a' to prevent rotation thereof.

26, 26, indicates a pair of plungers slidably fitting diametrically related through openings 26a formed in the adjacent arm 1x, each plunger being provided at its inner end with a screw threaded extension which is threaded into the adjacent pressure member 25, whereby movement of the plungers inwardly will exert pressure on the friction members 24 and movement thereof outwardly will relieve the pressure. The mounting of the plungers 26 in the openings 26a prevents rotation of the pressure member 25.

The axle 1 and plungers 26, 26, are formed with alined through openings 27, 27', respectively, in registry with an opening 27a extending through the adjacent arm 1x.

A thrust rod 28 extends through these openings and is removably connected at its upper end to the lower end of a piston rod 29 having at its upper end a piston 29' which is reciprocatable in an enlarged opening 30 (also formed in the arm 1x). The walls of the opening 30 form the side walls of a cylinder for the piston 29'.

The inner side wall of the opening 27' formed in each plunger 26 is of convex shape to provide a cam and the thrust rod 28 is provided with annular recesses 31 the walls of which endwise of the rod are concaved substantially complementary to the convex walls of the openings 27' to form cams which engage the convex walls of the openings 27'. When these parts are in normal position, that is, pressure on the braking elements is relieved, the recesses 31 are in alinement with the plungers 26 (as shown in Fig. 1), but operation of the thrust rod upwardly, due to operation of the piston 29', will effect a co-action between the walls of the recesses 31 and the convex walls of the plungers 26 and move the latter inwardly, whereby a braking action on the wheel will take place. It will be obvious that if the piston 29' is arranged to be at the upper end of its cylinder when the camming elements are in normal position, operation of the piston 29' downwardly will effect a braking operation.

Means are provided for moving the plunger 26 outwardly when the thrust rod 28 moves into normal position, to insure relief of the braking elements or slippage therebetween. These means are preferably mounted in the plunger 26, the outer end portions of which are recessed to accommodate the relieving means, each of which comprises the following:

32 indicates an annular member having screw threaded engagement with the inner wall of the recess adjacent the outer end thereof. The inner wall of the member 32 forms a guide for the outer end of an endwise movable pin 33. The inner end of the pin 33 is arranged to engage the wall of the recess 31 in the adjacent rod 28. The pin 33, adjacent its inner end is provided with a collar 33' which slidably engages the walls of the recess to guide and support the inner end thereof, and between the collar 33' and the member 32 is a coiled spring 34, which normally tends to move the pin inwardly, so that due to the engagement of the pin 33 with the wall of the recess 31 the spring pressure will be exerted on the annular member 32 and through it to the plunger 26 to move the latter outwardly. When the thrust rod 28 is moved upwardly, the spring 34 will yield to permit movement of the pin 33 outwardly.

The upper end wall of the cylinder 30 is provided on the lower end of a casing 35. The casing 35 encloses the valve, which controls the flow of the fluid under pressure to the cylinder 30 and its discharge therefrom, and the operating means for the valve. The external wall of the casing 35 adjacent its upper end is provided with screw threads which engage screw threads on the wall of the opening 30, whereby the casing is fixed therein and may be adjusted endwise of the opening to vary the stroke of the piston 29'. The valve consists of (a) a sleeve 36 fitting the inner wall of the casing 35, the sleeve and casing being formed with a plurality of alined ports for the flow of the fluid to the cylinder at opposite sides of the piston therein and (b) a reciprocatable plunger 37 forming the valve element and having spaced annular recesses 38, 38', arranged to register with these parts for in-flow and out-flow of the fluid, in the following manner, the plunger being shown in its down position;

39 is an inlet duct connected at its outer end with the fluid supply and connected at its inner end to alined inlet ports 40, 40', in registry with the recess 38.

The port 40' is connected to a duct 41 leading to the upper end of the cylinder. 42 indicates a duct leading from the lower end of the cylinder and connected to the alined outlet ports 43 which are in registry with the recess 38'. The recess 38' is in registry with the alined outlet ports 43, 43', which are connected to a duct 44, the latter being connected to a suitable discharge pipe leading to a suitable sump. Upon movement of the plunger 37 to its other or upper position, the inlet ports 40, 40' are closed thereby and the recess 38 registers with alined outlet ports 46 formed in the casing and sleeve, which ports at one side thereof are connected to a branch duct connected to the duct 41 and at their other side are connected by a duct 46' to the discharge pipe 44, whereas the outlet ports 43, 43', are closed by the plunger and the recess 38' registers with alined inlet ports 47 formed in the casing and sleeve, which ports at one side thereof are connected with the inlet duct 39 and at their other side connected by a branch duct 48 with the duct 42. Accordingly, in one position of the plunger, the inlet duct 39 for the fluid is connected with the cylinder at one side of the piston 29' and the cylinder at the opposite side of the piston is connected to the discharge pipe 44 and in the other position of the plunger these connections are reversed.

As shown in Fig. 1, the face of the upper and wall of the cylinder and the lower face of the piston 29' are relieved annularly to insure fluid pressure against the piston when it is at either end of the cylinder and is to be moved toward its opposite end.

The operating means for the plunger 37 consists of a double acting solenoid comprising spaced coils 49, 49' and a core 50 connected to the upper end of the plunger 37, the circuits for the coils 49, 49' being separately closed to energize either coil to effect movement of the core from one position to the other position to operate the plunger. It will be understood that the circuits for the coils 49 or 49' are simultaneously closed by a suitable switch so that both plungers 28 will be moved together in the same direction.

What I claim is:

1. In a wheel, the combination with an axle and an arm in which one end of said axle is mounted, of a tired wheel mounted on said axle, said wheel including a rim for the tire, the end portion of said rim adjacent said arm being offset to form an annular chamber, braking elements mounted in said chamber, said arm being formed with an opening extending radially of said axle, and means mounted in said opening and operatively connected to said braking elements for operating the latter.

2. A wheel as claimed in claim 1 wherein said braking elements consist of a series of annular disks, alternate disks being splined to the side wall of said off-set, a pressure member having a collar within said chamber and to which the other disks are splined and diametrically related plungers disposed parallel to said axle and engaging said pressure member and arranged to be simultaneously operated by said operating means.

3. In a wheel, the combination with an axle and an arm in which one end of said axle is mounted, of a tired wheel mounted on said axle, said wheel including a rim for the tire, the end portion of said rim adjacent said arm being offset to form an annular chamber, braking elements mounted in said chamber, and means carried by said arm for operating said braking elements, said operating means consisting of a cylinder and a piston, a rod between said piston and the braking elements, means for supplying a fluid under pressure to the opposite ends of said cylinder, a valve for controlling the flow of the fluid to either end of the cylinder and its discharge from the opposite end of the cylinder and means for operating said valve.

4. In a wheel, the combination with an axle and a bifurcated member supporting the opposite ends of said axle, a rim around said axle, a tire mounted on said rim, one outer end portion of said rim being enlarged to form an annular chamber, bearings between said rim and axle, a plurality of annular braking elements in side by side relation in said chamber, and means in the bifurcation adjacent said braking elements for operating the latter, said operating means including a hydraulically operated element reciprocatable in said bifurcation and a plurality of spaced devices slidably mounted in said bifurcation and arranged to be operated by said element to effect engagement of said braking elements one with another.

5. In a wheel mounting, the combination with a supporting member having a bifurcated outer end, of a wheel having an axle supported at its opposite ends in the bifurcations of said member and a hollow member surrounding said axle, one end of said hollow member being shaped to form an annular chamber, and a brake comprising a series of annular disks surrounding said axle and mounted in said chamber for movement axially of said axle, an annular pressure member mounted in the outer end of said chamber and provided with an inwardly extending circumferential wall, alternate disks being splined to the side wall of said chamber and the remaining disks being splined to said wall, spaced plungers mounted in the bifurcation related to said chamber for movement parallel to said axle and connected to said pressure member, cams for operating said plungers in one direction and means for operating said cams.

6. In a wheel, the combination with an axle and a bifurcated member supporting the opposite ends of said axle of a wheel having a rim rotatably mounted on said axle, one outer end portion of said rim being enlarged to form an annular chamber, braking elements consisting of a series of annular disks in side by side relation in said chamber, a collar in said chamber surrounding said rim, alternate disks being splined to the side wall of said chamber and the other disks being splined to said collar, a plunger mounted in the bifurcation adjacent said chamber to move inwardly parallel to said axle to operate said disks into frictional engagement, a thrust rod carried by said bifurcation and movable radially of said axle, means for reciprocating said thrust rod, and co-acting elements between said thrust rod and said plunger arranged to move the latter inwardly when said rod is moved in one direction.

7. A wheel as claimed in claim 6 wherein said plunger is fixed to said collar and a spring operated element is provided between said rod and said plunger for moving the latter outwardly to release said disks upon movement of said rod in the opposite direction.

8. In a wheel, the combination with an axle and a bifurcated member fixedly supporting the opposite ends of said axle, of a wheel having a rim rotatably mounted on said axle, one end portion of said rim being enlarged to form an annular chamber, a collar in said chamber surrounding said rim, braking elements in said chamber consisting of a series of disks, alternate disks being splined to the side wall of said chamber and the other disks being splined to said collar, diametrically related plungers disposed parallel to said axle in the bifurcation related to said chamber, connected to said collar and movable inwardly to operate said collar and effect frictional engagement between said disks, said bifurcation being formed with an opening extending radially of said axle and said axle being formed with a through diametrically extending opening registering with said radial opening, a thrust rod extending through said openings, means for reciprocating said rod, and co-acting elements between said rod and said plungers for simultaneously operating the latter inwardly when said rod is moved in one direction.

EDWARD E. WALLACE.